(12) United States Patent
Mielenz

(10) Patent No.: US 11,214,249 B2
(45) Date of Patent: Jan. 4, 2022

(54) METHOD FOR PERFORMING A REACTION TO PERSONS ON VEHICLES

(71) Applicant: Robert Bosch GmbH, Stuttgart (DE)

(72) Inventor: Holger Mielenz, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 26 days.

(21) Appl. No.: 16/812,642

(22) Filed: Mar. 9, 2020

(65) Prior Publication Data

US 2020/0290607 A1 Sep. 17, 2020

(30) Foreign Application Priority Data

Mar. 12, 2019 (DE) .................. 10 2019 203 334.2

(51) Int. Cl.
*B60W 30/00* (2006.01)
*B60W 30/095* (2012.01)
*B60W 30/09* (2012.01)

(52) U.S. Cl.
CPC ........ *B60W 30/0956* (2013.01); *B60W 30/09* (2013.01); *B60W 2530/201* (2020.02); *B60W 2540/223* (2020.02); *B60W 2540/225* (2020.02); *B60W 2554/4029* (2020.02); *B60W 2554/4045* (2020.02); *B60W 2554/4049* (2020.02); *B60W 2710/18* (2013.01); *B60W 2720/10* (2013.01)

(58) Field of Classification Search
CPC ............. B60W 30/0956; B60W 30/09; B60W 2540/225; B60W 2554/4029; B60W 2530/201; B60W 2540/223; B60W 2554/4045; B60W 2554/4049; B60W 2710/18; B60W 2720/10
See application file for complete search history.

(56) References Cited

U.S. PATENT DOCUMENTS

| | | | |
|---|---|---|---|
| 2017/0371347 A1* | 12/2017 | Cohen | G05D 1/0253 |
| 2018/0238098 A1* | 8/2018 | Rhode et al. | E05F 15/73 |
| 2020/0079371 A1* | 3/2020 | Sakamoto | B60W 30/0956 |
| 2020/0202209 A1* | 6/2020 | Mao | G06N 3/08 |

FOREIGN PATENT DOCUMENTS

| | | | |
|---|---|---|---|
| DE | 103 12 252 A1 | 9/2004 | |
| DE | 10 2004 062 459 A1 | 4/2006 | |
| DE | 10 2013 205 882 A1 | 10/2014 | |

* cited by examiner

*Primary Examiner* — Thomas G Black
*Assistant Examiner* — Brittany Renee Peko
(74) *Attorney, Agent, or Firm* — Maginot, Moore & Beck LLP

(57) ABSTRACT

A method initiates a reaction of a first vehicle to a person in the environment of a second vehicle. The person is on a road on which the first vehicle is travelling and the second vehicle is detected. Measurement data determined by at least one sensor unit are received by a control unit. The control unit carries out a classification and registers the evaluated data as a person and as a second vehicle. Motion vectors of the person are determined and the expected movement of the person is calculated. A position and width of the vehicle doors of the second vehicle are determined or estimated on the basis of the measurement data. A probability of the person opening a vehicle door is calculated. A reaction of the first vehicle is initiated by the control unit depending on the calculated probability.

16 Claims, 2 Drawing Sheets

METHOD FOR PERFORMING A REACTION TO PERSONS ON VEHICLES

This application claims priority under 35 U.S.C. § 119 to patent application no. DE 10 2019 203 334.2, filed on Mar. 12, 2019 in Germany, the disclosure of which is incorporated herein by reference in its entirety.

The disclosure relates to a method for initiating a reaction of a first vehicle to a person in the environment of a second vehicle in which at least one person on a road being travelled on by the first vehicle and at least one other vehicle are detected. Furthermore, the disclosure relates to a control unit, a computer program as well as a machine-readable memory medium.

BACKGROUND

In urban traffic areas, in particular in side streets, vehicles park on one side of the road in the longitudinal direction. In particular, in the case of an increased traffic density or a narrow road width, people on the road can walk along the parked vehicles and open vehicle doors in order to get in. Such behavior is often observed in inner cities. In doing so, the people expect cooperative behavior of road users.

Although automated and semi-automated systems are known that can control a vehicle through urban traffic and through bottlenecks, such systems only reduce the vehicle speed for people detected on the road. For example, if a person opens a vehicle door that protrudes into or impairs the vehicle's lane, emergency braking is usually initiated by such systems.

SUMMARY

The object underlying the disclosure can be seen to propose a method and a control unit that detect the opening of vehicle doors in advance and can initiate reactions that are adapted to the situation.

This object is achieved by means of the respective subject matter of the independent claims. Advantageous embodiments of the disclosure are the subject matter of the respective dependent subordinate claims.

According to one aspect of the disclosure, a method for initiating a reaction of a first vehicle to a person in the environment of a second vehicle is provided. In particular, the person may be on a road that is being driven on by the first vehicle.

With the method, at least one person on a road being travelled by the first vehicle and at least one second person will be detected. The at least one second vehicle is preferably a parked vehicle that the person probably wants to enter. For this purpose, a vehicle door must be opened in advance by the person and protrudes into the lane of the first vehicle and may affect road safety. The at least one sensor unit may be, for example, one or more cameras, at least one lidar sensor, at least one radar sensor and the like. In particular, the sensor unit may be designed as an environmental sensor of the first vehicle.

The measurement data determined by the at least one sensor unit are received by a control unit. The control unit may be an on-board control unit or a control unit external to the vehicle, such as a server unit or a cloud.

The control unit performs a classification based on the received measurement data and records the evaluated data as a person and as a second vehicle.

Motion vectors of the person are determined and the expected movement of the person is calculated. A position and a width of vehicle doors of the second vehicle are determined or estimated on the basis of the measurement data.

A probability of the person opening a vehicle door is then calculated, wherein a reaction of the first vehicle is initiated by the control unit depending on the calculated probability.

According to another aspect of the disclosure, a control unit is provided, wherein the control unit is set up to perform the method.

In addition, according to one aspect of the disclosure a computer program is provided that includes commands which, when the computer program is executed by a control unit, cause the control unit to perform the method. According to another aspect of the disclosure, a machine-readable memory medium is provided, on which the computer program is stored.

The method can preferably be used for vehicles which can be operated, according to the BASt definition, assisted, semi-automated, highly automated and/or fully automated or without a driver. The at least one first vehicle may be designed, for example, as such a vehicle.

The method allows in particular people ahead on a road to be detected. For this purpose, a classification of the measurement data of ambient objects as pedestrians or passers-by is carried out. The movement of the person can be tracked in the form of one or more motion vectors. This process can be carried out for a defined period of time. Based on the motion vectors determined in this way, an expected movement sequence of the person can be predicted or estimated.

In addition to such a predicted direction of movement of the person, parked second vehicles can also be detected, and their door positions and dimensions of the door width can be estimated. This can be carried out, for example, by measuring the dimensions directly or based on the recognition of a vehicle model. The recognized vehicle model can be used to obtain relevant information about the dimensions of the vehicle door in a database.

From a defined probability of the person's intention to open the vehicle door, the necessary room requirement of an open door of the vehicle can be checked based on the previously determined door width and the impairment and the impairment of the first vehicle by the door swinging out. This information can be used to recalculate the trajectory of the first vehicle or to adjust the vehicle speed.

If the remaining road width is not sufficient for the passage of the first vehicle in the event of an open vehicle door, the first vehicle is decelerated to allow safe boarding of the person.

In the case of sufficient road width despite the vehicle door being opened, the trajectory of the first vehicle can be adjusted to avoid or prevent a collision with the vehicle door.

The method can avoid a dangerous situation resulting from suddenly opening a vehicle door by identifying the person's signs of such an action and by resolving a collision situation by means of control instructions of the control unit.

In particular, dangerous situations and accidents with passers-by can be avoided that result from cooperative behavior of other road users and the door of a parked vehicle thereby being opened spontaneously. Furthermore, the control system and the control unit provide comfort reactions, such as early braking or early bypassing of likely obstacles in such situations, and thus increase customer value.

According to one embodiment, the protrusion of the vehicle door of the second vehicle into the lane and/or the effect of an open vehicle door on a planned trajectory of the first vehicle will be determined or estimated. As a result, in particular, depending on the width of the vehicle door the estimated width of the second vehicle when the vehicle door is open is calculated and the effects on the onward travel of the first vehicle are derived. In particular, a check can be carried out as to whether the first vehicle can pass the second vehicle unhindered, must carry out an adjustment of the trajectory or must stop before the second vehicle.

According to a further embodiment, in order to determine the probability of opening the vehicle door, external signs of the person are determined or interpreted by the control unit. For this purpose, a check will be carried out by evaluating the measurement data as to how the person is behaving. For example, an approach of the person to a vehicle door, the movement of the person's arms and the like can be examined and the intention to open a vehicle door can be estimated with a defined probability.

According to a further embodiment, in order to determine the probability of the vehicle door being opened, a distance of the person from the vehicle door, a distance of the person from the second vehicle, the viewing direction of the person, the person's posture, the motion vectors of the person, the action of the person and/or the interaction of the person with the vehicle can be taken into account. This can be used to determine a prediction of the person's intentions and the person's likely behavior. In particular, a number of motion vectors or velocity vectors of the person representing the movement of the arms, legs, torso and the like can be monitored. Taking into account uncertainties, a probability can be determined that the person will actually open a vehicle door or that the person will just pass by the second vehicle. The person's viewing direction to the vehicle door handle or a slightly bent posture for grasping the vehicle door handle can also be monitored by the environment sensor system of the first vehicle and taken into account for a calculation of the probability. In particular, it can be detected by evaluating the measurement data whether the person is already reaching for the vehicle door handle or is already holding it in his hand.

According to a further embodiment, the reaction of the first vehicle to a vehicle door that is open or is likely to open is initiated by the control unit in the form of a reaction model, wherein an action of the person predetermined by the control unit is taken into account when selecting a situation-dependent reaction model. This allows the first vehicle to be prepared for a reaction that is dependent on the expected conduct of the person. The reaction model may include a defined braking behavior, an avoidance behavior or a slower continuation. In particular, a rapid reaction to the person's action may be initiated by the control unit.

According to a further exemplary embodiment, a road restriction is derived on the basis of the door width of the second vehicle when the door is opened that is determined or estimated by the control unit. The road restriction may be configured in the form of a volume or an area that can protrude into the current lane of the first vehicle. In particular, the road restriction may be defined as a static or dynamic obstacle for the first vehicle.

According to a further exemplary embodiment, a new trajectory is calculated and/or a speed of the first vehicle is reduced on the basis of the determined road restriction. Therefore one or more reactions can be prepared by the control unit based on the road restriction detected as an obstacle and may be initiated depending on the probability of the occurrence of the event.

According to a further exemplary embodiment, in the event of an expected collision of the first vehicle with the open door of the second vehicle, a braking process of the first vehicle is initiated. If a remaining road width in the event of a vehicle door being open is not sufficient to perform an avoidance maneuver, a braking process can be initiated directly or in defined stages by the control unit. For example, the vehicle speed can be reduced in advance in one step or in several steps. This allows the first vehicle to avoid sudden emergency braking maneuvers.

According to a further exemplary embodiment, if there is sufficient passing width on the lane of the first vehicle, the trajectory is adapted for avoidance by the control unit. As a result, the avoidance reaction of the first vehicle to an open vehicle door of a second vehicle parked in the longitudinal direction can only be considered if there is sufficient space for this purpose. Road safety can therefore be increased.

According to a further exemplary embodiment, the boundaries of the lane are observed by taking into account the vehicle width of the first vehicle. As a result, the avoidance reaction of the first vehicle can be carried out particularly safely. Additionally, a safety distance from a roadside and from the vehicle door can be taken into account.

According to a further exemplary embodiment, the onward travel of the first vehicle is initiated after the door of the second vehicle is closed or after the person leaves the road. This may cause the risk or the probability that a vehicle door will be opened in front of the first vehicle to be excluded.

BRIEF DESCRIPTION OF THE DRAWINGS

Preferred exemplary embodiments of the disclosure are explained in more detail below based on greatly simplified schematic representations. In the figures

DETAILED DESCRIPTION

Figure 1:
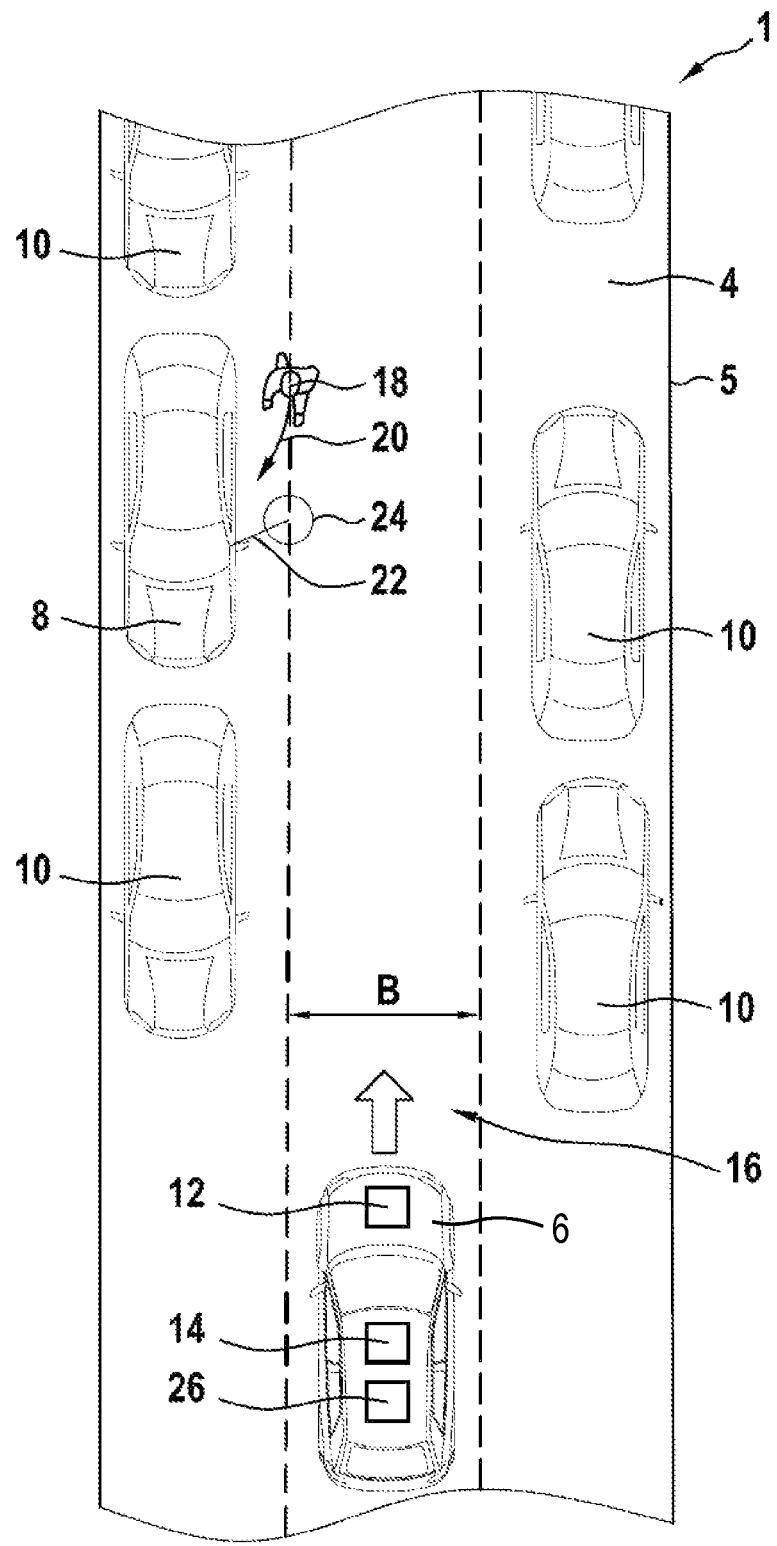
FIG. 1 shows a schematic representation of a traffic situation for illustrating a method according to an exemplary embodiment and FIG. 2 shows a schematic flow diagram of the method according to the exemplary embodiment.

In FIG. 1, a schematic representation of a traffic situation 1 for illustrating a method 2 according to an embodiment is shown.

A narrowed road 4 is shown. The road 4 is being travelled on by a first vehicle 6. A number of second vehicles 8, 10 are parked at both lateral edges 5 of the road 4. The second vehicles 8, 10 are parked and are thus static objects or obstacles for the first vehicle 6.

The first vehicle 6 is designed as a highly automated vehicle according to the BASt definition. The respective actuators and control units for maintaining the highly automated operation are not shown for the sake of the overview.

The first vehicle 6 has an environment sensor system 12. The environment sensor system 12 can consist, for example, of at least one camera sensor, a lidar sensor, a radar sensor and the like. The environment sensor system 12 provides information about the vehicle environment in the form of measurement data.

Furthermore, the first vehicle 6 has a control unit 14. The control unit 14 is set up to receive and evaluate the measurement data of the environment sensor system 12. Furthermore, the control unit 14 is set up to influence the vehicle control of the first vehicle 6 based on the evaluations carried out on the measurement data.

The control unit 14 may be designed as a control unit that is also responsible for the automated operation of the vehicle 6. Alternatively, the control unit 14 may be a separate control unit or a module of such a control unit.

The first vehicle 6 requires a lane width B defined by the vehicle dimensions for unhindered travel. The lane 16 of the first vehicle 6 is determined based on the lane width B.

Furthermore, in the traffic situation 1, a person 18 or a pedestrian that is moving on the road 4 is represented. A corresponding motion vector 20 of the person 18 is also shown. The motion vector 20 is determined by the control unit 14 by evaluating the measurement data. Based on the determined motion vector 20, a future behavior of the person 18 is estimated. For this purpose, for example, the motion vector 20 or the motion vectors can be approximately extended for the next 1 to 20 seconds. This allows the control unit 14 to determine that the person 18 is specifically moving towards the second vehicle 8 in a deliberate manner. The person 18 is outside the lane 16 of the first vehicle 6 and therefore does not constitute a traffic obstruction.

The control unit 14 calculates a probability that the person 18 will open a vehicle door 22 of the second vehicle 8 based on the measurement data of the environment sensor system 12. This probability is over 70% in the case shown.

In parallel with this, the control unit 14 can determine the size of the vehicle door 22. This may be done by directly evaluating the measurement data or by determining a vehicle make and reading out the size of the vehicle door 22 from a database. Based on the dimension of the vehicle door 22, the control unit 14 can determine whether an open vehicle door 22 would protrude into the lane 16 and thus impair the onward travel of the first vehicle 6.

According to the exemplary embodiment, opening the vehicle door 22 would cause a protrusion into the width B of the lane 16 and thus constitute a road restriction 24 for the first vehicle 6.

Based on the information obtained by the control unit 14, with an open vehicle door 22 an avoidance maneuver cannot be performed. Due to the high probability that the person 18 will open the door 22, the vehicle speed of the first vehicle 6 is reduced in advance, so that timely braking to a standstill is comfortably possible.

The control unit 14 has a machine readable memory medium 26, in which a computer program can be stored that is suitable to perform the method. The control unit H can access and execute the computer program stored in the memory medium 26 for this purpose.

Figure 2:
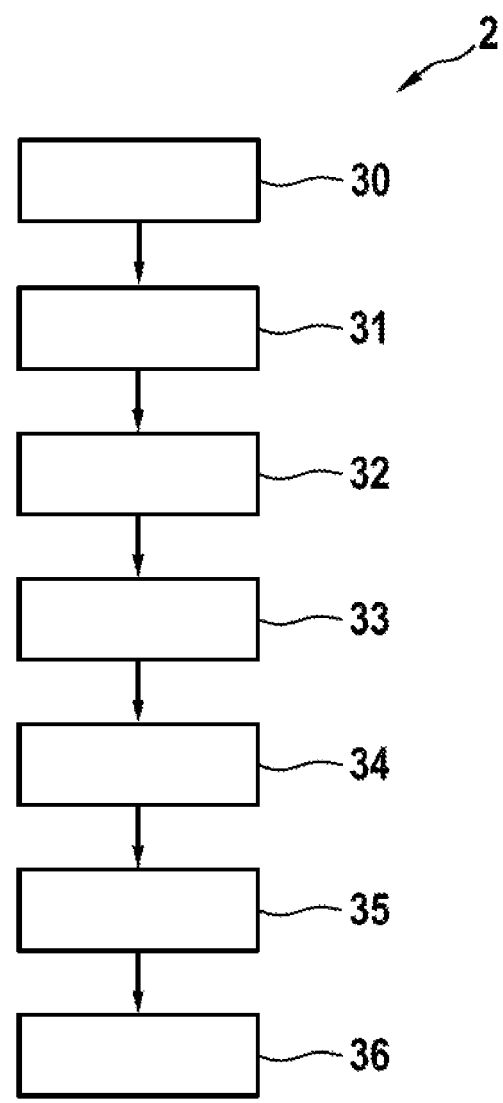

FIG. 2 shows a schematic flow diagram of a method 2 according to an embodiment. The method 2 is used to initiate a reaction of the first vehicle 6 to a person 18 in the environment of the second vehicle 8. In particular, the person 18 may be on the road 4 on which the first vehicle 6 is travelling.

With the method, in a step 30 at least one person 18 on a road 4 being travelled on by the first vehicle 6 and at least one second vehicle 8, 10 are detected 30 by at least one sensor unit or environment sensor system 12.

The at least one second vehicle is preferably a parked vehicle that the person probably wants to enter. To do this, a vehicle door must first be opened by the person, which can protrude into the lane of the first vehicle and affect road safety. The at least one sensor unit may, for example, be one or more cameras, at least one lidar sensor, at least one radar sensor and the like. In particular, the sensor unit may be designed as an environment sensor system of the first vehicle.

The measurement data determined by the at least one sensor unit are received 31 by the control unit 14.

Based on the received measurement data, the control unit 14 carries out a classification 32 and registers the evaluated data as a person 18 and as a second vehicle 8.

In a further step, motion vectors 20 of the person 18 are determined and expected movements of the person 18 are calculated 33.

Subsequently, a position and a width of the vehicle doors 22 of the second vehicle 8 are determined or estimated on the basis of the measurement data 34.

In a further step of the method 2, a probability for the opening of a vehicle door 22 by the person 18 is calculated 35. Depending on the calculated probability, a reaction of the first vehicle 6 is initiated by the control unit 14 or at least prepared 36.

What is claimed is:

1. A method for initiating a reaction of a first vehicle to a person in the environment of a second vehicle, the person is on a road on which the first vehicle is travelling and the second vehicle is detected, the method comprising:
    determining measurement data with at least one sensor unit;
    receiving the determined measurement data with a control unit;
    classifying with the control unit;
    registering evaluated data as the person and as the second vehicle;
    determining motion vectors of the person;
    calculating expected movements of the person;
    determining or estimating a position and a width of vehicle doors of the second vehicle based on the determined measurement data;
    calculating a probability of the person opening a first vehicle door of the second vehicle; and
    initiating a reaction of the first vehicle with the control unit depending on the calculated probability.

2. The method according to claim 1, further comprising:
    determining or estimating a protrusion of the first vehicle door of the second vehicle into a lane and/or an effect of an open vehicle door of the second vehicle on a planned trajectory of the first vehicle.

3. The method according to claim 1, further comprising:
    determining or interpreting external signs of the person with the control unit in order to determine the probability of opening the first vehicle door.

4. The method according to claim 1, further comprising:
    determining the probability of the person opening the first vehicle door based on a distance from the person to the first vehicle door.

5. The method according to claim 1, further comprising:
    initiating the reaction of the first vehicle to the first vehicle door that is open or likely to open with the control unit as a reaction model; and
    selecting a situation-dependent reaction model based on an action of the person predicted by the control unit.

6. The method according to claim 1, further comprising:
    deriving a road restriction based on a door width of the second vehicle when the first vehicle door is open as determined or estimated by the control unit.

7. The method according to claim 6, further comprising:
    calculating a new trajectory based on the determined road restriction and/or reducing a speed of the first vehicle.

8. The method according to claim 1, further comprising:
    initiating a braking process of the first vehicle in an event of an expected collision of the first vehicle with the opened first vehicle door of the second vehicle.

9. The method according to claim 1, further comprising:
adjusting a trajectory for avoidance with the control unit in an event of sufficient passing width on the road of the first vehicle.

10. The method according to claim 9, further comprising: observing boundaries of the road based on a width of the first vehicle.

11. The method according to claim 1, further comprising:
initiating continuation of the first vehicle after the person closes the first vehicle door of the second vehicle or leaves the road.

12. The method according to claim 1, wherein the control unit is configured to carry out the method.

13. A non-transitory machine readable memory medium storing a computer program, which when executed by a control unit, carries out the method of claim 1.

14. The method according to claim 1, further comprising: determining the probability of the person opening the first vehicle door based on a direction of view of the person.

15. The method according to claim 1, further comprising: determining the probability of the person opening the first vehicle door based on a posture of the person.

16. The method according to claim 1, further comprising: determining the probability of the person opening the first vehicle door based on the person's interaction with the second vehicle.

* * * * *